(12) United States Patent
Misu et al.

(10) Patent No.: US 7,182,106 B2
(45) Date of Patent: Feb. 27, 2007

(54) FLUID DISPENSATION METHOD

(75) Inventors: Isao Misu, Kyoto (JP); Masaaki Uchiyama, Kyoto (JP); Tatsuya Yoshida, Kyoto (JP); Takeshi Ichinose, Kyoto (JP)

(73) Assignee: Nidec Corporation, Kyoto (JP)

( * ) Notice: Subject to any disclaimer, the term of this patent is extended or adjusted under 35 U.S.C. 154(b) by 180 days.

(21) Appl. No.: 10/906,494

(22) Filed: Feb. 23, 2005

(65) Prior Publication Data
US 2005/0184085 A1 Aug. 25, 2005

(30) Foreign Application Priority Data
Feb. 23, 2004 (JP) ............... 2004-047117

(51) Int. Cl.
*B65B 1/04* (2006.01)
(52) U.S. Cl. ............... 141/4; 141/31; 141/67; 222/420; 184/1.5
(58) Field of Classification Search ........ 141/130, 141/1, 67, 31, 4; 222/1, 420; 184/1.5
See application file for complete search history.

(56) References Cited

U.S. PATENT DOCUMENTS 6,253,957 B1  7/2001  Messerly et al.
6,386,463 B1*  5/2002  Ganan-Calvo .......... 239/8
6,733,180 B2*  5/2004  Nakamura ............. 384/100

FOREIGN PATENT DOCUMENTS

| JP | H05-346561 A | 12/1993 |
| JP | H10-142616 A | 5/1998 |
| JP | 2001-165153 A | 6/2001 |
| JP | 2002-174243 A | 6/2002 |
| JP | 2004-359340 A | 12/2004 |

* cited by examiner

*Primary Examiner*—Steven O. Douglas
(74) *Attorney, Agent, or Firm*—James Judge

(57) ABSTRACT

Under a reduced-pressure environment, stopping at will liquid that flows out from a nozzle tip, or dispensing liquid with the level of energy at which it will not splatter has proven difficult. To address such difficulties, parameters including nozzle bore, and surface tension and viscosity of, and delivery pressure on, a liquid are selected so that the surface tension that acts on the liquid when flowing out from the nozzle tip will be greater than the momentum of the liquid. By dispensing liquid under such conditions, outflow of the liquid is reliably controlled, and rapid infusion work is realized.

20 Claims, 11 Drawing Sheets

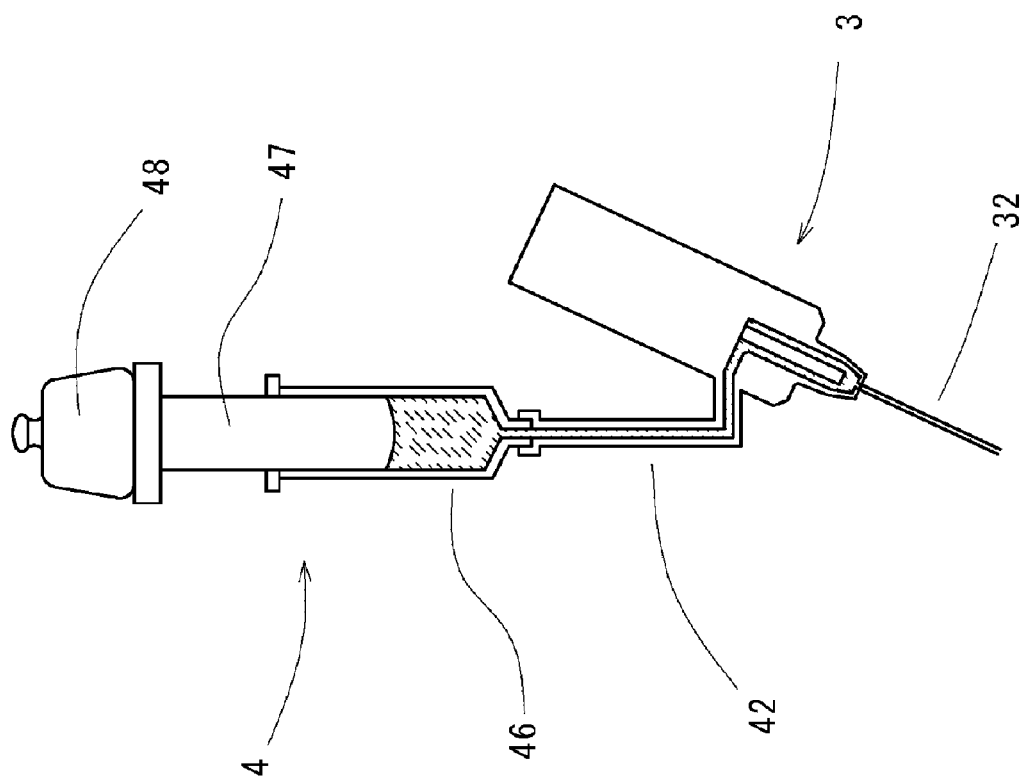
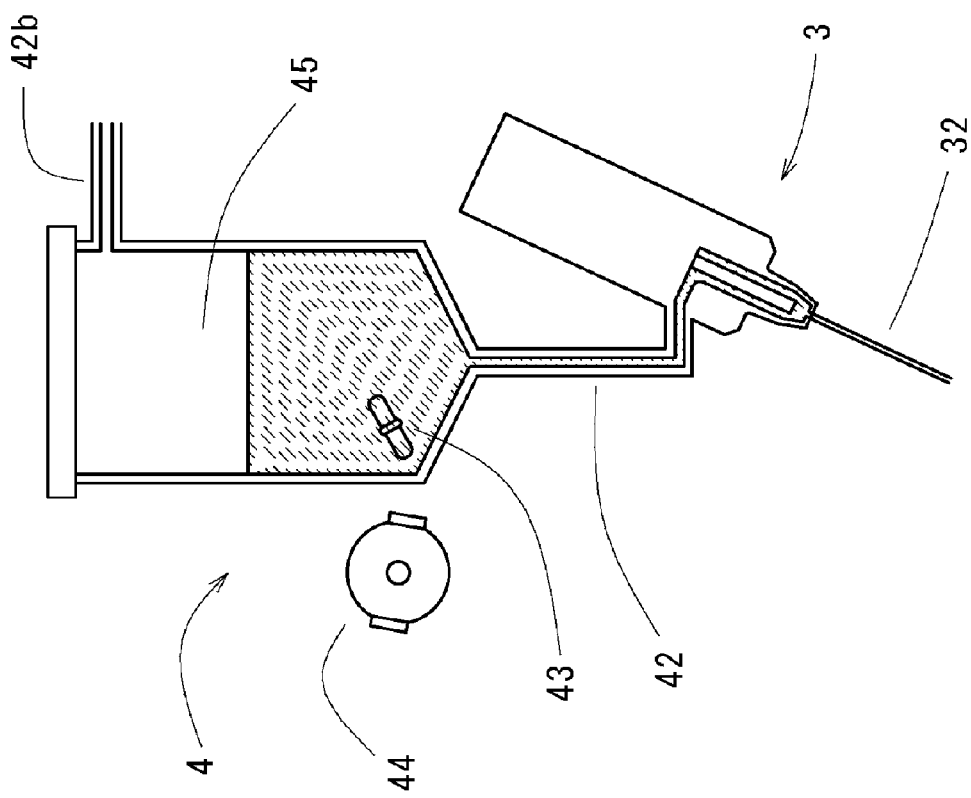
FIG. 2B
FIG. 2A

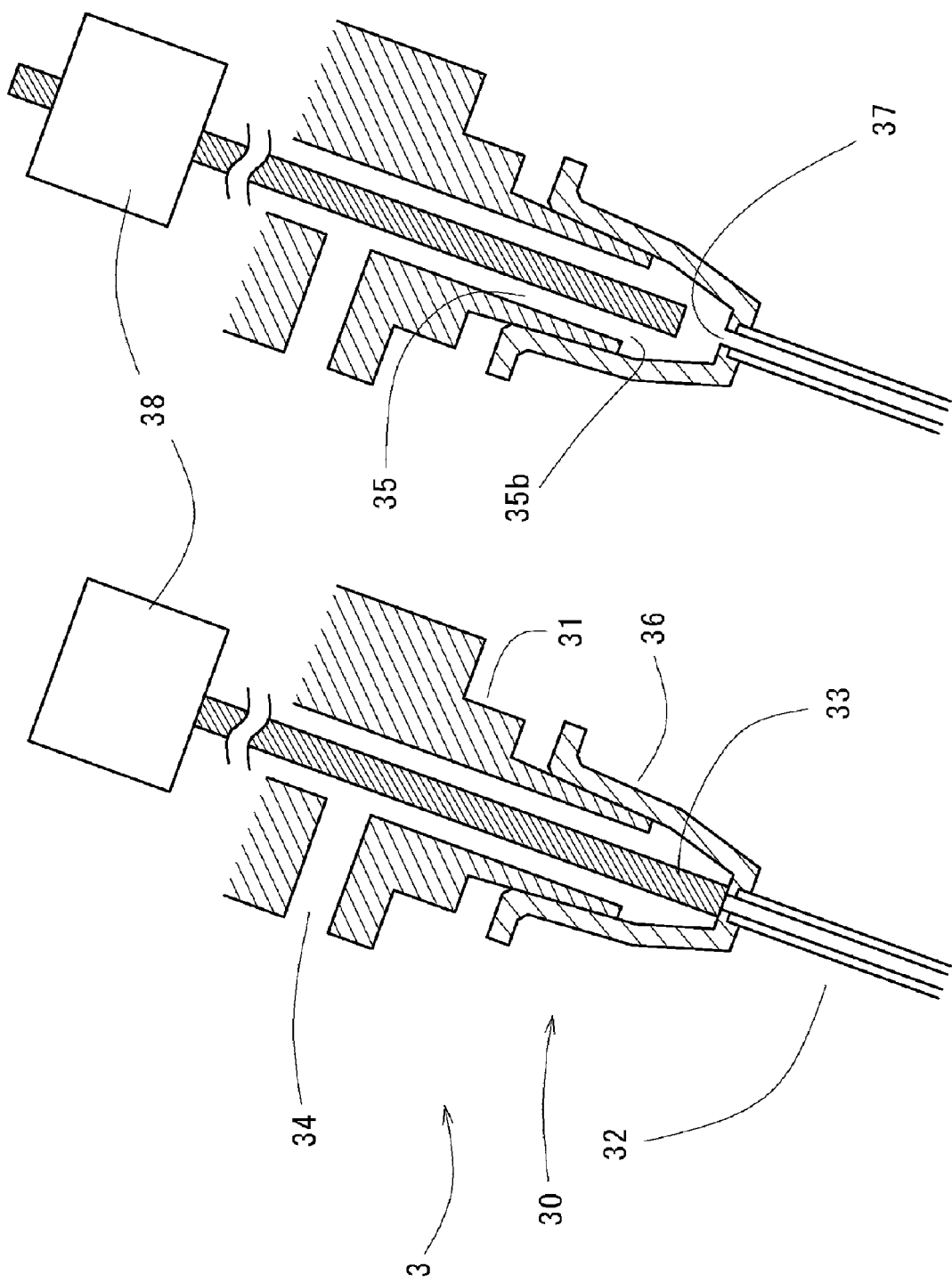

FLUID DISPENSATION METHOD

BACKGROUND OF THE INVENTION

1. Technical Field

The present invention relates to fluid dispensation methods whereby a predetermined quantity of a liquid is poured under a low-pressure environment into specific regions of mechanical and other devices. In particular the invention relates to methods of dispensing lubricating fluid into dynamic-pressure bearing devices employed in signal record/playback devices such as hard-disk drives.

2. Description of the Related Art

In order to carry out dosed infusion of a small volume of fluid into a targeted site, to date microdispensers have been employed. The simplest microdispensers are made up of a small-diameter nozzle, and a mechanism for sending fluids into the nozzle. Components constituting industrially employed microdispensers include a nozzle section, a mechanism that imparts delivery pressure to the fluid, a valve mechanism for controlling fluid outflow, and a mechanism that controls a series of dispenser actions.

Nevertheless, utilizing a microdispensers to accurately stream a predetermined volume of lubricating fluid into components or mechanical devices when placed under a vacuum is not necessarily a simple matter. The difficulty is that, different from applications in which dispensing is carried out under atmospheric pressure, under a reduced-pressure environment, despite shutting the valve in an effort to stop the infusion, the flow does not immediately cease. The reason it does not is because in contrast to the situation under atmospheric pressure, in which when the valve is shut the fluid is held back by the atmospheric pressure from flowing out any further, under a reduced-pressure environment that restraining force attenuates, such that the fluid continues, due to inertia, to flow out. In addition to attenuating the back pressure on the outflowing fluid, a reduced-pressure environment hastens the fluid outflow speed, such that the fluid vigorously strikes the infusion target object, as a consequence of which the fluid splatters in splashes, giving rise to such problems as the infusion volume falling short, and the fluid sticking to areas where it is not desired to have the fluid adhere.

In order to eliminate these sorts of troubles, a need to dispense the lubricating oil sufficiently slowly is brought about. This demand prolongs the time required for a single dispensation cycle, which impairs productivity.

Thus, an infusion method allowing a predetermined volume of a fluid to be accurately infused without contaminating the environs, and whereby productivity is high has not been known to date.

BRIEF SUMMARY OF THE INVENTION

In an infusion method of the invention that is the subject of the present application, a cylindrical capillary tube of constant inner diameter is utilized as a nozzle, and the optional sizes of and delivery pressure for the nozzle are selected to obey the following numerical expressions.

$$\frac{2\sigma}{a} > \rho \left( \frac{P}{L} \frac{a^2}{8\eta} \right)^2 - P_a \qquad \text{Expression 1}$$

$$\rho \left( \frac{P}{L} \frac{a^2}{8\eta} \right)^2 - P_a > 0 \qquad \text{Expression 2}$$

Fluid outflowing from the cylindrical capillary tube undergoes braking due to surface tension in the tip portion of the tube. The conditions under which the braking force surpasses the momentum of the fluid are given by Expression 1. When Expression 1 is satisfied, the fluid that flows out from the capillary-tube tip will under those conditions lose its speed at the tip, which stops the fluid from overshooting the targeted site and splattering about. Moreover, because the fluid outflow ceases at the same time the supplying of the fluid to the capillary tube is stopped, controlling the fluid outflow volume is facilitated and made highly precise. When Expression 1 is not satisfied, despite the fluid supply having been stopped, fluid remaining inside the capillary tube continues to flow owing to inertia, which impedes control of the outflow volume.

Although the present invention is premised on the tip portion of the cylindrical capillary tube and the object of the infusion process being under a reduced-pressure environment, the pressure therein is not zero. The infusion job is carried out at around 100 Pa, or at a pressure below that. Hence, if with respect to this pressure the outflowing speed of the lubricating fluid were sufficiently slow, the outflow could be stopped by the pressure alone. However, such conditions amount to a situation in which the infusion speed would be so slight as to downgrade productivity.

Expression 2 is a relation that from this perspective gives the lower limit for the right-hand side of Expression 1. This limit is greater than zero. In other words, Expression 2 gives the conditions under which the fluid will be supplied at a speed faster than that at which the fluid outflow could be stopped if there were no braking due to surface tension.

In an infusion method of the present invention, in order to have the fluid flow out for a predetermined period of time only, a valve mechanism can be utilized. Because the section of the valve mechanism that shuts off the flowpath is adjacent to the basal portion of the cylindrical capillary tube, in the interval from the valve-mechanism shutoff to the capillary-tube tip there is no wasted space. Initiation/cutoff of fluid outflow in the infusion process therefore responds more reliably to on/off switching by the valve mechanism. What is more, because there is no wasted space, along the route reaching from the valve mechanism to the tip end of the capillary tube there is no region in which air bubbles stay. This feature also contributes to reliable control of the infusion operation.

In an infusion method of the present invention, the infusion work may be implemented applying atmospheric pressure to the fluid. The fact that atmospheric pressure is a pressure source from which relatively steady pressure is inexpensively available enables high-precision fluid infusion jobs to be carried out while equipment costs are held down.

In an infusion method of the application-subject invention, a valve mechanism that responds with considerable rapidity to the infusion speed may be employed. Doing so makes it all the more possible to reduce infusion-volume discrepancies attendant on infusion initiation/cutoff.

In an infusion method of the subject invention, lubricating fluid is infused into a dynamic-pressure bearing device. Because the method thus allows a high-precision infusion process to be carried out under a reduced-pressure environment, dispensation of lubricating fluid into a dynamic-pressure bearing device can be efficiently implemented.

From the following detailed description in conjunction with the accompanying drawings, the foregoing and other objects, features, aspects and advantages of the present invention will become readily apparent to those skilled in the art.

BRIEF DESCRIPTION OF THE SEVERAL VIEWS OF THE DRAWINGS

FIG. 2 is schematic views of an dispensing device and a fluid tank;

FIG. 3 is magnified views of key portions of the dispensing device;

Figure 1:
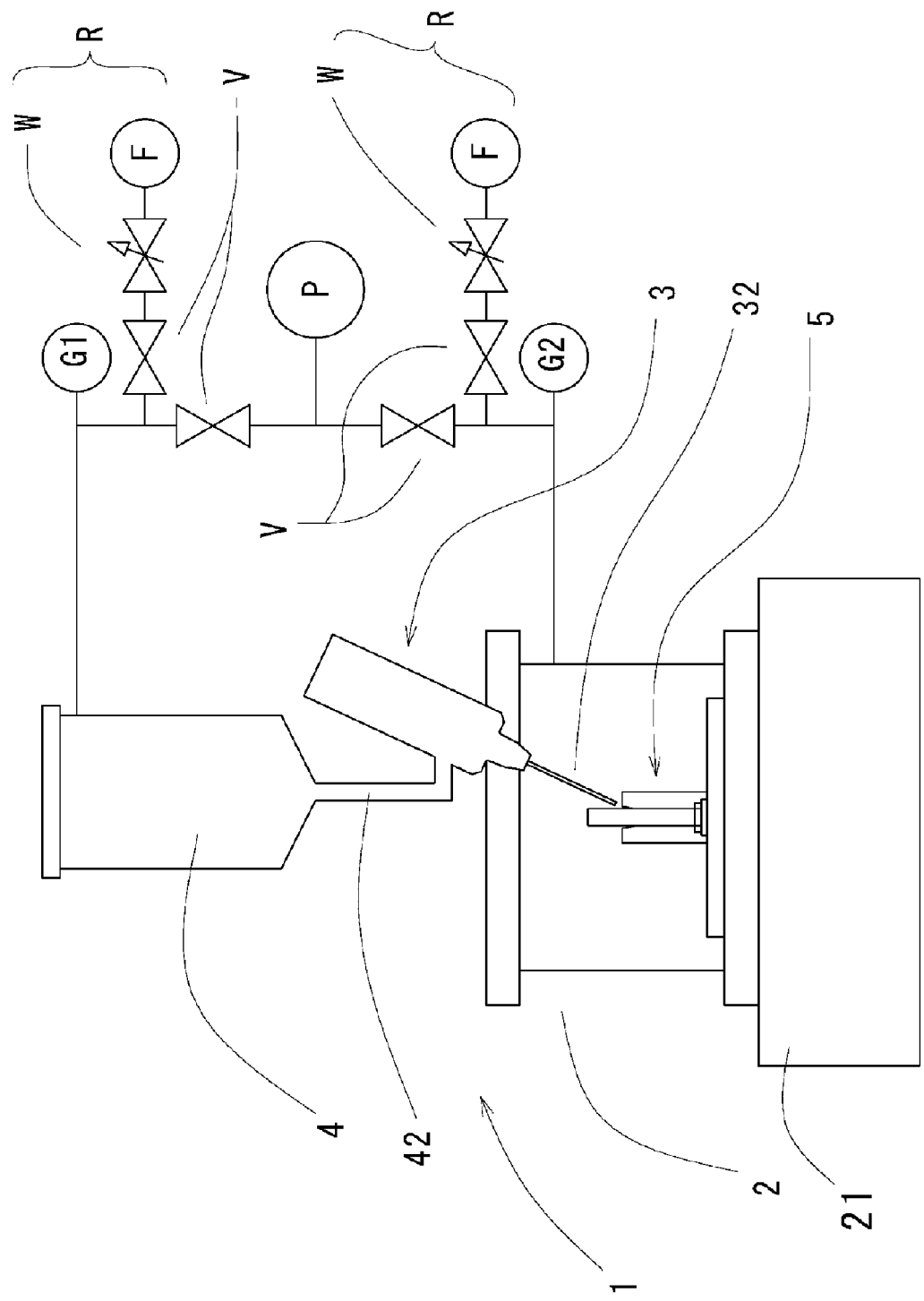
FIG. 1 is a schematic view of a lubricating-fluid infusion apparatus involving the present invention.

DETAILED DESCRIPTION OF THE INVENTION (1) Lubricating-Fluid Infusion Apparatus (1-1) Device Overall Reference is made to FIG. 1, which illustrates a lubricating-fluid infusion apparatus 1 for implementing a lubricating-fluid infusion method involving the present invention. The lubricating-fluid infusion apparatus 1 is made up of a vacuum chamber 2, an dispenser 3, a lubricating fluid tank 4, and, for pumping down the interior of these components, a vacuum pumping device and a gas-introduction mechanism R, as well as their connecting supply lines.

In this implementation, a general rotary pump P is employed as the vacuum pumping device. The gas-introduction mechanism R, comprising a flow control valve W, and a filter F for preventing dust from invading the mechanism, introduces ambient air into the supply lines. To further ensure that invasion of dust is prevented, the flow control valve W adjusted to make it so that the air inflow speed does not grow excessively large. Reference marks G1 and G2 indicate Penning gauges, which enable the internal pressure of the vacuum chamber 2 and fluid tank 4 to be monitored.

The dispenser 3 is made up of a valve mechanism 30 (shown in FIG. 3) and a cylindrical capillary tube 32 mounted in the tip of the valve mechanism. The dispenser 3 is connected to the bottom portion of the fluid tank 4 through a feed duct 42. A dynamic-pressure bearing device 5 is set inside the vacuum chamber 2, and is infused with lubricating fluid supplied through the tip of the capillary tube 32.

The vacuum chamber 2 is of glass manufacture in a lidded cylindrical form that is open-ended along the underside; thus the status within the chamber may be observed from without. As depicted in FIG. 1, the open-ended portion of the chamber along its underside is closed off by a pedestal 21. This occlusion is maintained airtight by means of a not-illustrated O-ring made of rubber. The vacuum chamber 2 is connected to the rotary pump P and the gas-introduction mechanism R via ventilation valves V and W.

FIG. 2 illustrates the fluid tank 4 and the dispenser 3. As depicted in FIG. 2A, an empty space 45 is left in the upper portion of the reservoir 4, and by pumping down this space, the concentration of gas dissolved in the lubricating fluid can be lowered. Relevant to that operation is a conduit 42b connected to this region of the reservoir 4, through which the pressure of the empty space 45 is reduced/elevated. During pump-down, a stirring mechanism is operated to promote the reducing of the concentration of gas dissolved into the lubricating fluid. The stirring mechanism is made up of a rod 44 furnished with a magnet, and a stirrer 43 likewise furnished with a magnet, wherein rotating the rod 44 rotates the stirrer 43 in the interior of the fluid tank 4. The fluid tank 4 interior is joined to the dispenser 3 via the feed duct 42, and in turn is joined to the exterior through the capillary tube 32 mounted in the tip of the dispenser 3.

In order to dispense lubricating fluid into the dynamic-pressure bearing device, a sufficiently large, stabilized ejection pressure must be attendant on the lubricating fluid sent into the dispenser 3. Otherwise, the fluid-dispensation volume will vary with each dispensing operation, which is prohibitive of assuring uniform product quality, especially in cases in which bearing devices are mass-produced.

For that purpose, in the FIG. 2A instance, ejection pressure is imparted to the lubricating fluid by introducing air at atmospheric pressure into the empty space 45. Meanwhile, represented in FIG. 2B is a different method, in which ejection pressure is imparted to lubricating fluid stored within a cylinder 46 by placing a plummet 48 onto a plunger 47 fitted into the cylinder 46. An advantage to the FIG. 2B method is that pressure may be imparted to the lubricating fluid without exposing it to air. However, because the lubricating fluid once having been fed into the fluid tank 4 can no longer be degassed, the fluid must be adjusted ahead of time to adequately reduce the concentration of gas dissolved in the fluid. Which of these two methods to choose is best decided by the technician taking other factors into consideration.

(1-2) Valve Mechanism

As will be detailed later, in the lubricating-fluid infusion apparatus 1, with the interior of the fluid tank 4 in a reduced-pressure state in order to degas the lubricating fluid, the capillary tube 32 tip is in a situation in which it is exposed to atmospheric pressure. Under those circumstances, external air tries to enter in, heading toward the fluid tank 4. Conversely, when the infusion apparatus 1 dispenses lubricating fluid, on the one hand the tip of the capillary tube 32 is under reduced pressure; on the other, the empty space 45 is put at atmospheric pressure, imparting dispensing pressure to the lubricating-fluid. Under these circumstances, the lubricating fluid tries to flow out, heading toward the exterior. In either case, the flow has to be stopped with the valve mechanism. Consequently, what is sought in a valve mechanism for the dispenser 3 is that the valve will not give rise to leaking not only when the internal pressure is in a higher state, but also when the external pressure is. A valve mechanism 30 of the structure illustrated in FIG. 3 can be employed as such a valve.

The description now turns to FIG. 3, a sectional view illustrating key features of the dispenser 3. From the end portion of the cylindrical capillary tube 32, mounted in the tip of the dispenser 3, fluid is dispensed into the dynamic-pressure bearing device. Joined to the fluid tank 4 via the feed duct 42 is an inlet 34 through which lubricating fluid imparted with delivery pressure is supplied. In a supply hole 35 formed in a valve base part 31, an occluding rod 33 is accommodated for being pressed back and forth by a drive mechanism 38. When the occluding rod 33 is pressed downward in the figure by the drive mechanism 38, it closes off an occlusion hole 37, forming a shutoff (FIG. 3A). Conversely, when the rod is drawn upward in the figure, the occlusion hole 37 is cleared, permitting the passage of lubricating fluid (FIG. 3B). The drive mechanism 38 can be a device having the lone capability of simply shifting the occluding rod 33 back and forth, and can be constituted from, for example, a spring and an electromagnet. The occluding rod 33 can thus be driven at high speed merely by electrical on/off switching.

In a valve mechanism 30 configured in this way, the occlusion established by the occluding rod 33 and the occlusion hole 37 is located extremely close to the basal end of the capillary tube 32 (nozzle); moreover, forward of the shutoff, there is no surplus cavity in which air bubbles and the like would get stuck. The lubricating-fluid flowpath in the dispenser 30 running forward of the occlusion is constituted almost exclusively by the cavity in the interior of the cylindrical capillary tube 32.

(2) Infusion Procedure (2-1) Infusion Process

Figure 4B:
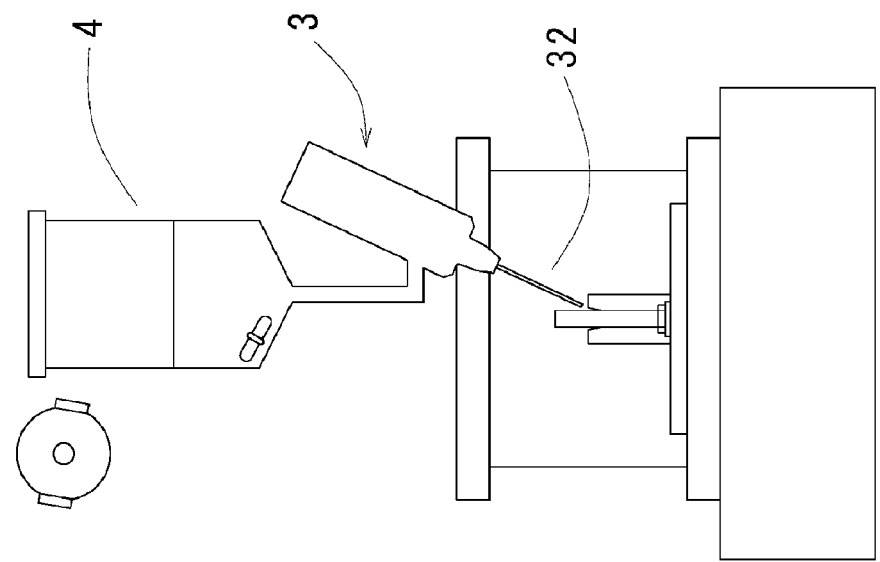
FIG. 4 is a diagram for explaining how the lubricating-fluid infusion apparatus operates.
Figure 4A:
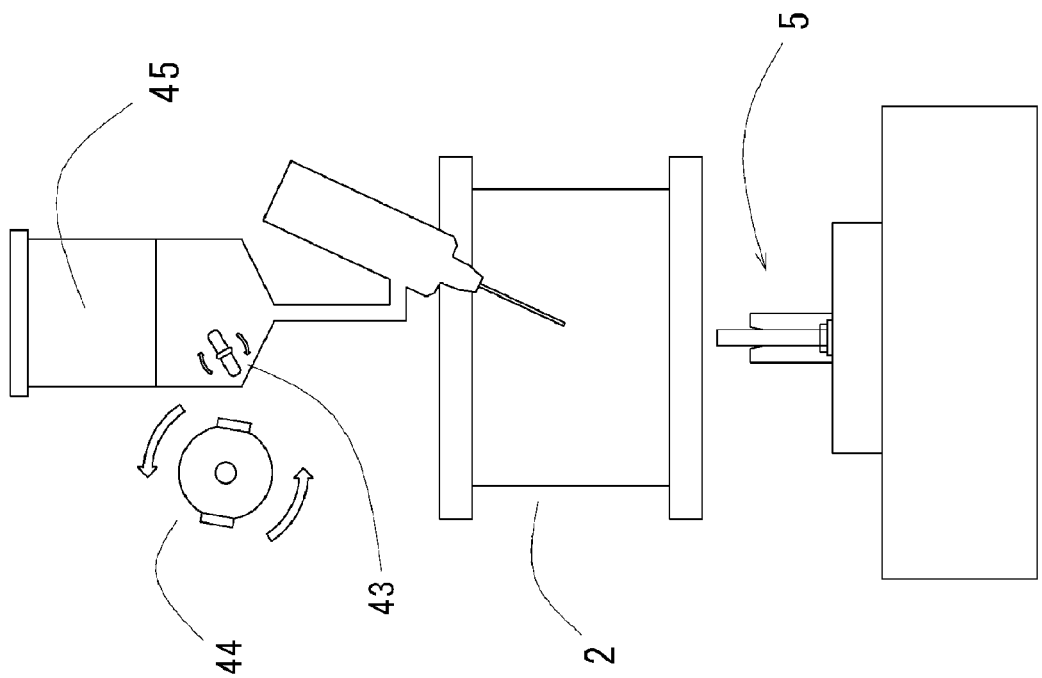

Initially the vacuum chamber 2 is lifted up into its opened state as indicated in FIG. 4A, and the dynamic-pressure bearing device 5 is set in a predetermined position atop the pedestal 21. To heighten the accuracy with which the bearing device is located into place, a special jig or a precision-movable stage may be employed.

In this state, the inside of the vacuum chamber 2 is at atmospheric pressure whereas the empty space 45 in the fluid tank 4 is continuously evacuated, wherein the space is pumped down to a pressure of 10 Pa (first pressure). At the same time, by the magnet-equipped rod 44 rotating, the stirrer 43 plunged into the fluid tank 4 interior rotates, thus stirring the lubricating fluid. Gastightness between the fluid tank 4 and the vacuum chamber 2 is maintained by the dispenser 3. With the lubricating fluid being exposed to an atmosphere of 10 Pa in pressure, the evacuation and stirring are continued. Under such conditions, the concentration of gas present dissolved within the lubricating fluid may be deemed to be at a concentration about in equilibrium with that of the atmosphere of 10 Pa in pressure.

Next the vacuum chamber 2 is lowered to close off its open-ended side against the pedestal 21, and the interior is pumped down. The dispenser 3 and the fluid tank 4 are lowered together with the vacuum chamber 2, shifting to a low position. As a result, the tip of the capillary tube 32 is positioned into the seal section 53 (FIG. 5) formed in the open portion of the bearing gap of the dynamic-pressure bearing device 5. At the same time, as a result of the fluid tank 4 having shifted downward, the change in relative position of the rod 44 brings its magnetic force out of action, and thus the stirrer 43 stops rotating, halting the stirring action.

Then the evacuation level for the vacuum chamber 2 is adjusted (pressure-adjusting step) so that the internal pressure of the vacuum chamber 2 will go to a pressure (second pressure) somewhat higher than the first pressure.

After that, in order to impart delivery pressure to the lubricating fluid, ambient air is introduced into the empty space 45, raising it to atmospheric pressure. Ambient air is advantageous as the most readily available source for supplying constant pressure. Nevertheless, the space 45 does not necessarily have to be brought to atmospheric pressure, but according to requirements may equally well be brought beneath atmospheric or above atmospheric pressure, freely selected using a suitable device.

Next, the valve mechanism 30 is opened for a predetermined duration to deliver the proper quantity of lubricating fluid that the dynamic-pressure bearing device 5 is meant to retain. At that time, although the lubricating fluid in the fluid tank 4 interior will have been exposed to air at atmospheric pressure, because the stirring will have been stopped, in particular the lubricating fluid being drawn out from the lower portion of the fluid tank 4 will have been in a state of approximate equilibrium with the first pressure.

The lubricating fluid being ejected flows out from the tip of the capillary tube 32. At that point, lubricating fluid flowing out from the tip of the capillary tube 32 will not froth, because the internal pressure of the vacuum chamber 2 will have gone to 30 Pa (second pressure), which is greater than the first pressure. Therefore, the process of wiping up lubricating fluid having splattered due to frothing and become stuck to the dynamic-pressure bearing device can be omitted. What is more, the elimination of loss due to frothing reduces dispensation volume variation, making the dispensation volume more accurate.

It should be noted that in advance of the pressure-adjusting step, the interior of the vacuum chamber 2 may if necessary be momentarily pumped down to a pressure (fifth pressure) lower than the second pressure. For example, the chamber interior may be pumped down to the same 10-Pa level as the first pressure. Doing so makes evacuation of the bearing even more thorough. Prior to fluid dispensing, however, the chamber must be pressurized to a pressure (second pressure) higher than the first pressure to prevent the fluid from frothing.

(2-2) Status of Seal Section

Figure 5:
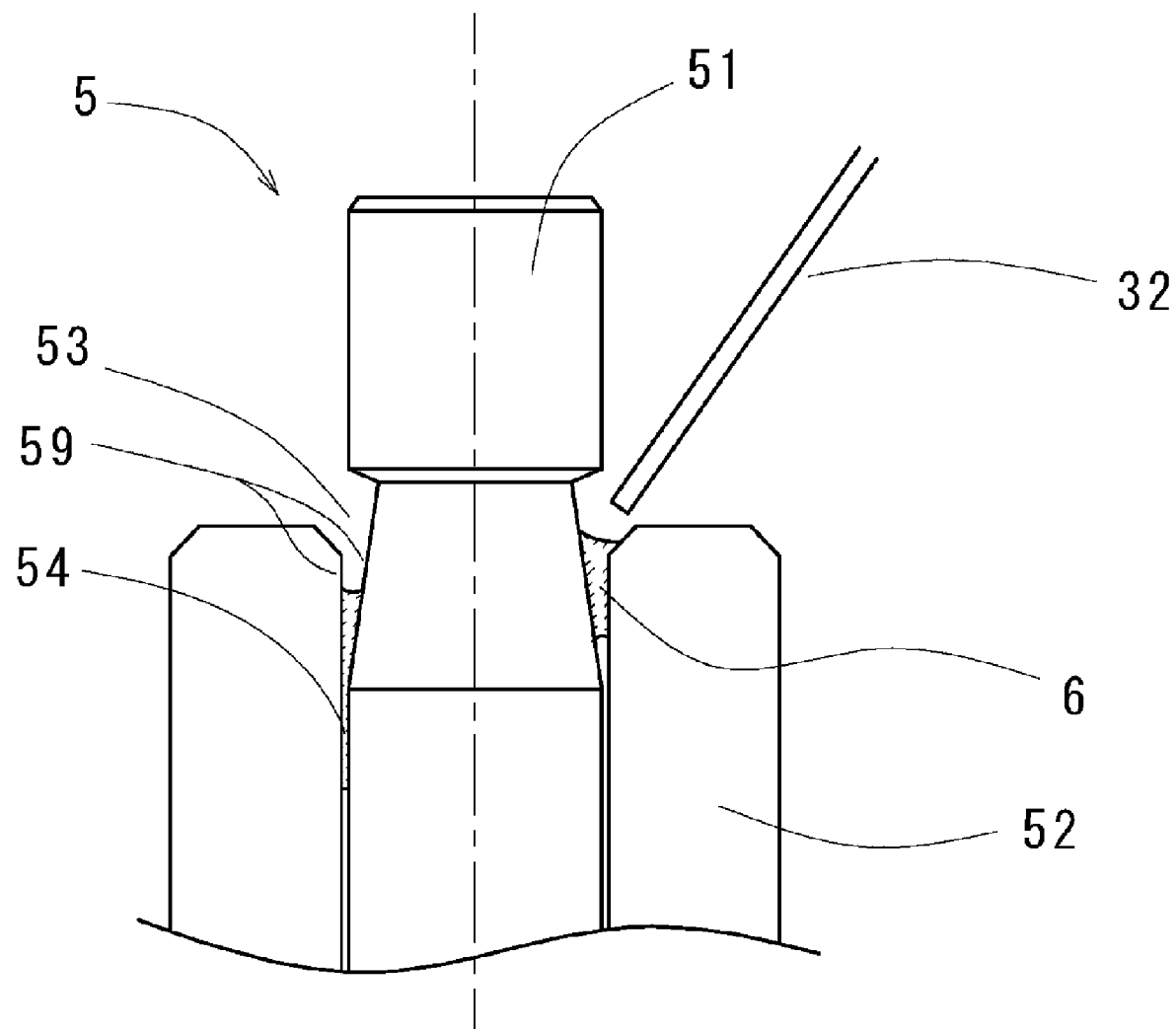
FIG. 5 is an enlarged view of the seal section of a dynamic-pressure bearing device.

FIG. 5 represents an enlarged view of the vicinity of the seal section 53 of the dynamic-pressure bearing device 5 right after having been infused with fluid.

The seal 53 is formed in the open end of the bearing gap—marked with reference numeral 54 in the figure—in between the shaft 51 and the sleeve 52. The tip of the cylindrical capillary tube 32 is drawn near the seal 53, to just short of touching its wall surfaces, in which state the lubricating fluid is dispensed. The shaft 51 constitutes a bearing-device rotary component, and the sleeve 52 constitutes a bearing-device stationary component. With the seal section 53 being formed in the open portion of the bearing gap, it surrounds the rotary component.

Lubricating fluid having been dispensed spreads around the entire the seal section due to its affinity for the seal-section wall surfaces, but does not reach the depths of the bearing gap 54. At this stage the lubricating fluid—marked with reference numeral 6 in FIG. 5—need not fill the seal section in its entirety, but must occupy the entire circuit of seal area of the gap. Moreover, by the bearing-device environs having been pumped down to 30 Pa beforehand, the bearing gap will have been pumped down to a pressure near that, and thus the lubricating fluid will be in a state in which due to its affinity for the wall surfaces it will readily enter into the depths of the bearing gap. The right-hand side of FIG. 5 schematically represents the immediate post-dispensation state of the fluid. Immediately post-dispensation the lubricating fluid 6 pools in the open portion of the bearing device, but by its affinity for the wall surfaces the fluid transitions at once into the state sketched on the left-hand side of the figure. In the figure left-hand side, the lubricating fluid has in part crept into the depths of the bearing gap 54, lowering the liquid surface of the lubricating fluid in the seal section 53 by that extent.

Depending on the configuration of the seal section 53, and on the quantity of lubricating fluid that the bearing is meant to hold, in some cases the requisite amount of lubricating fluid cannot be dispensed in a one-time operation. In such cases, the fluid dispensing job may be divided into two or more cycles. The second and subsequent fluid-dispensing operations then can be carried out by estimating the time, following the first-cycle fluid-dispensing job, for the lubricating fluid to spread around the entire seal section 53 and its liquid surface to drop sufficiently.

After the fluid dispensing operation is finished, the vacuum chamber 2 interior is repressurized (third pressure). The repressurization develops a pressure differential between the lubricating fluid 6 interior/exterior, forcing the lubricating fluid 6 into the depths of the bearing gap 54 and completing the lubricating-fluid dispensing job. Although it is easiest to repressurize back to atmospheric pressure, repressurization to a pressure lower than atmospheric will not impede the dispensing process, as long as the pressure is sufficient to force the lubricating fluid all the way into the bearing gap. In addition, the vacuum chamber 2 may again be evacuated and the fluid dispensing process carried out again, once lubricating fluid has been forced into the gap and sufficient space in the seal section 53 has been secured.

Figure 6:
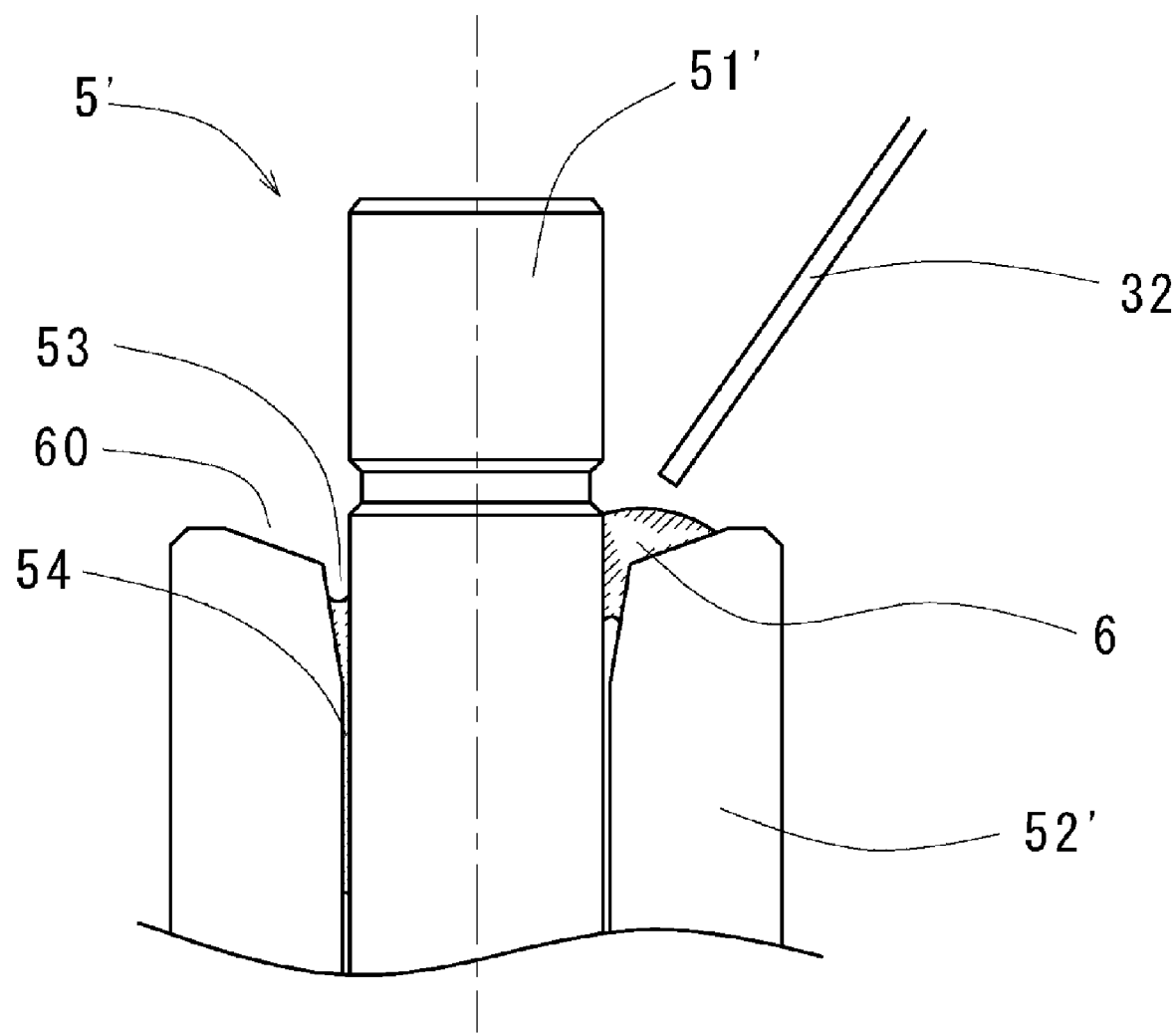
FIG. 6 is a second view of a dynamic-pressure bearing device seal section.

Reference is now made to FIG. 6, which, like FIG. 5, is an enlarged view of a bearing-device seal section, in this case in a dynamic-pressure bearing device 5' in which the upper-end face of the sleeve has a slope 60. A fluid-repellent film is formed on the slope and shaft surfaces. In implementations in which the dynamic-pressure bearing device is structured in this way, the dispensed lubricating fluid fills over the slope (right half of the figure), and by capillary action subsequently permeates its way into the bearing gap (left half of the figure). Benefits of having the slope 60 are not only that a large volume of lubricating fluid may be dispensed at once, but also that lubricating fluid does not get left behind on the upper-end face of the sleeve.

(2-3) Encroached Air Check

The dynamic-pressure bearing device 5 on which the dispensation procedure has been finished is then run through a procedure to check for the presence of air encroachment. Although the reliability of the bearing-device infusion method of present invention is extraordinarily high, foul dispensations can arise nevertheless. Thus, inspection for excluding such rejects is carried out.

Figure 7:
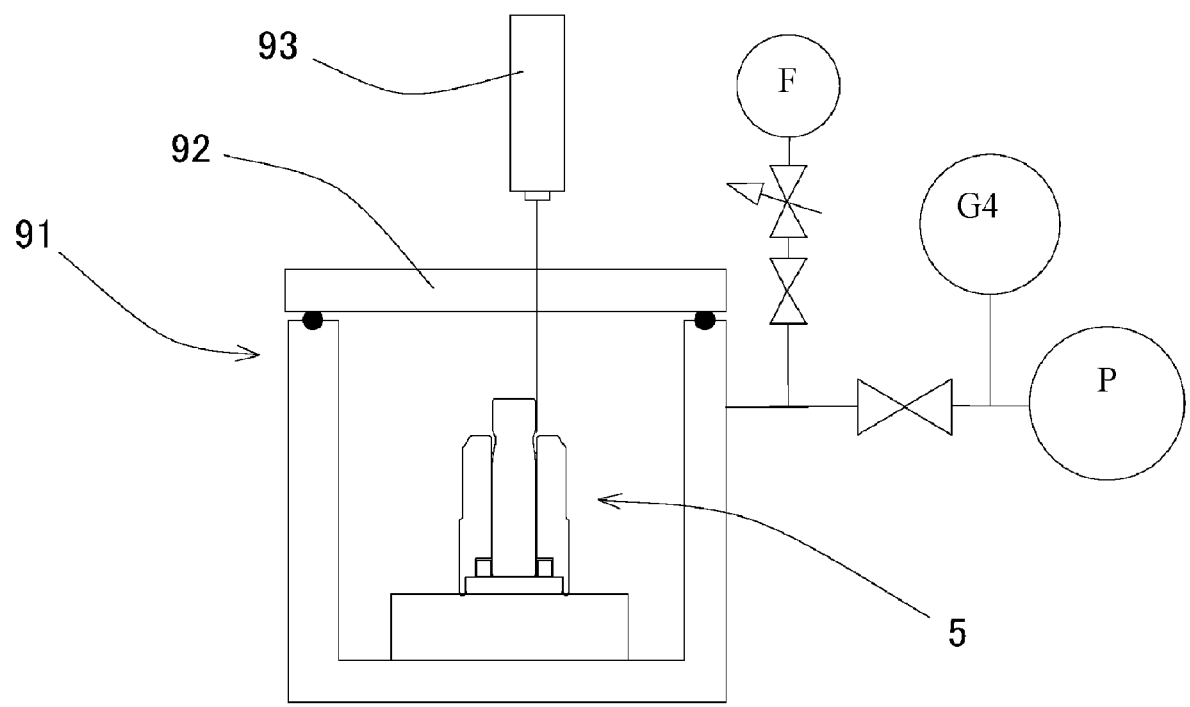
FIG. 7 is a diagram for explaining a procedure to check for air encroachment.

FIG. 7 is a diagram for explaining this procedure. The dispensation-processed bearing device 5 is put under atmospheric pressure. As far as the pressure environment for this procedure is concerned, as long as the pressure is higher than a later-described fourth pressure, inspection is in principle possible, but atmospheric pressure, being quite readily realized, is advantageous.

The dynamic-pressure bearing device 5 is set inside a vacuum case 91 furnished with an evacuation mechanism, and anchored using a suitable jig. In that situation, the level of the lubricating fluid in a state in which atmospheric pressure has been applied is measured. The measurement is made using a laser displacement sensor 93, whose beam passes through a glass lid 92 on the vacuum case 91.

Next a vacuum pump P and a venting valve are operated to lower the internal pressure of the vacuum case 91 to 1000 Pa, which is the fourth pressure. In this state, the fluid level is once again measured, and is compared with the level before the pressure was reduced. If upon this second measurement the amount by which the level has risen exceeds a predetermined value, the device is excluded as a reject; if not, the device is rendered an acceptable item.

When the dynamic-pressure bearing device is shipped by airfreight, the aircraft will fly in the lower regions of the stratosphere, which at maximum elevation is in the neighborhood of 14 km into the sky. At that elevation the atmospheric pressure is on the order of 140 hPa, which is considerably larger than 1000 Pa (10 hPa). Consequently, if a dynamic-pressure bearing device has passed the reduced-pressure test at 1000 Pa, then even if the device is transported in a cargo bay that is not pressurized in the least, the likelihood of fluid leakage occurring may be deemed to be extremely small.

(2-4) Preprocess Lubricating—Fluid Degassing and Feeding into the Infusion Apparatus The lubricating fluid that is fed into the lubricating-fluid infusion apparatus 1 is subjected to a special degassing process in advance, which shortens the time required for the degassing process within the fluid tank 4. In an infusion method of the present invention, lubricating fluid that is insufficiently degassed because the interior of the fluid tank 4 is repeatedly exposed to the air may be deaerated with greater assurance in a separate vacuum chamber initially.

Figure 8:
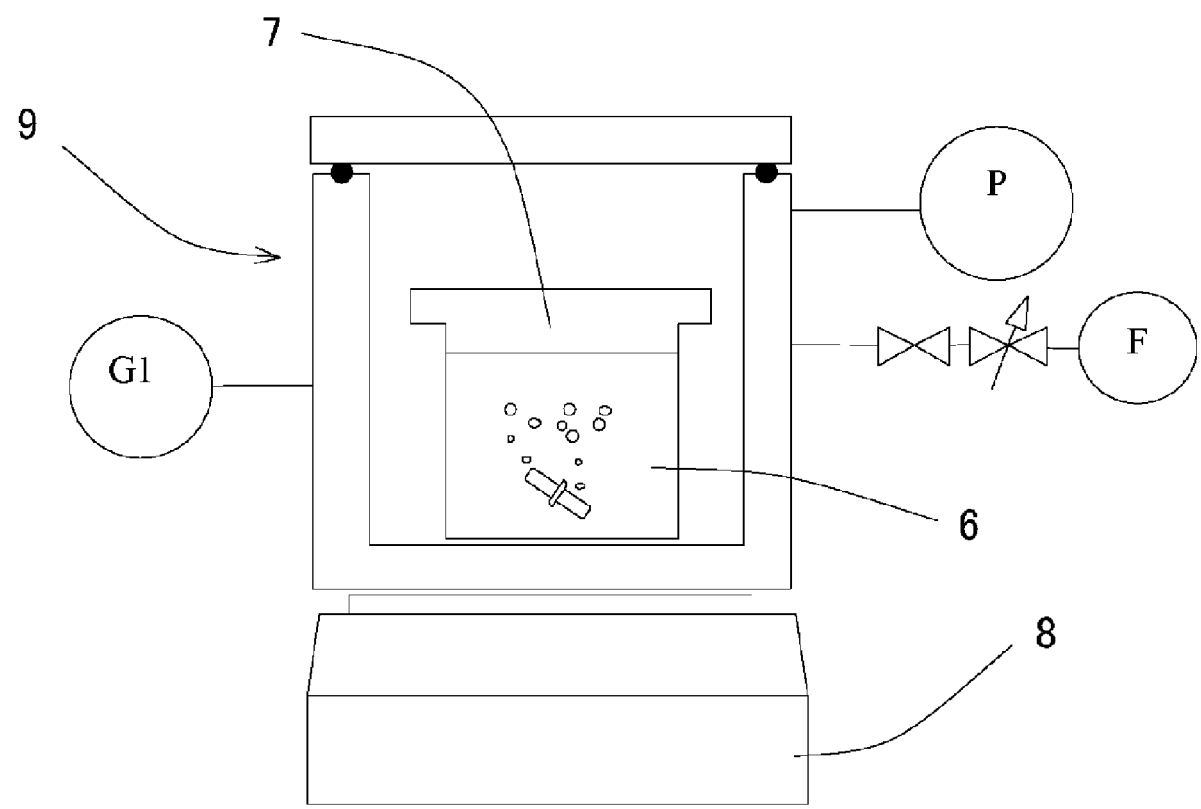
FIG. 8 is a diagram for explaining a lubricating-fluid degassing procedure.

FIG. 8 illustrates the configuration of a degassing device utilized for such objectives. A vacuum case 9 is placed atop a magnetic-stirrer drive mechanism 8, and within a lubricating-fluid reservoir 7 inside the case 9 lubricating fluid 6 is contained.

The vacuum case 9 interior is pumped down by a vacuum pump P to a pressure lower than the first pressure. A good target is pumping down to 10 Pa or less to keep on evacuating the case further. Long-term stirring in that state is continued, reducing dissolved gas until the level at which it is in equilibrium with this pressure ambient.

Figure 9:
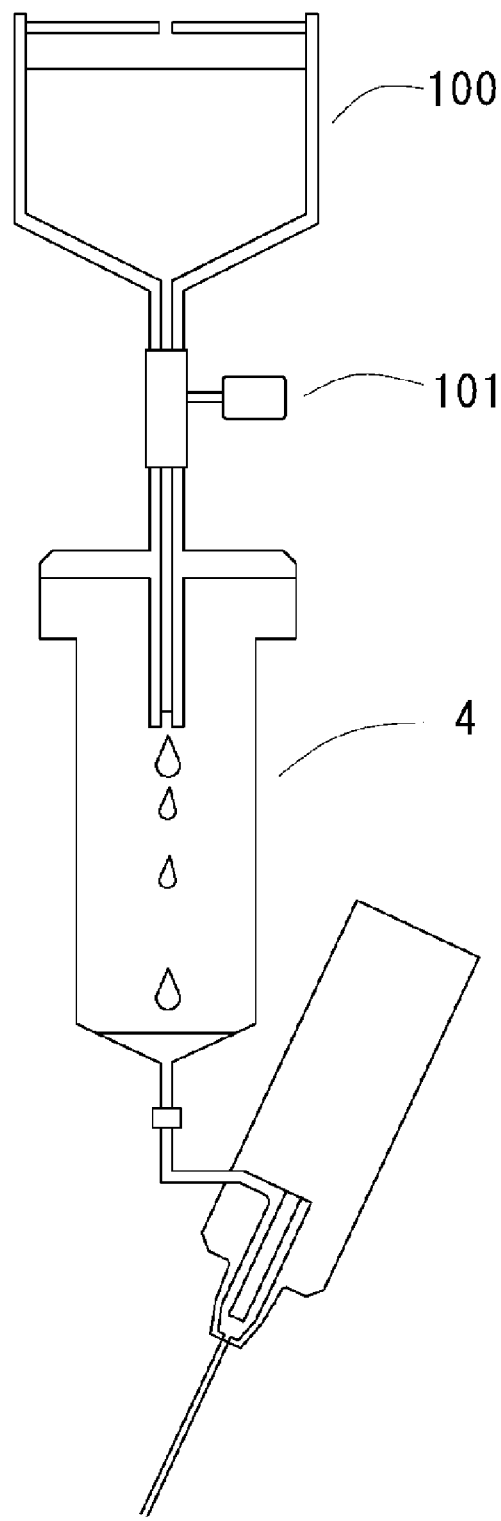
FIG. 9 is a diagram for explaining a procedure to trickle-feed lubricating fluid into the fluid tank.
Figure 10A:
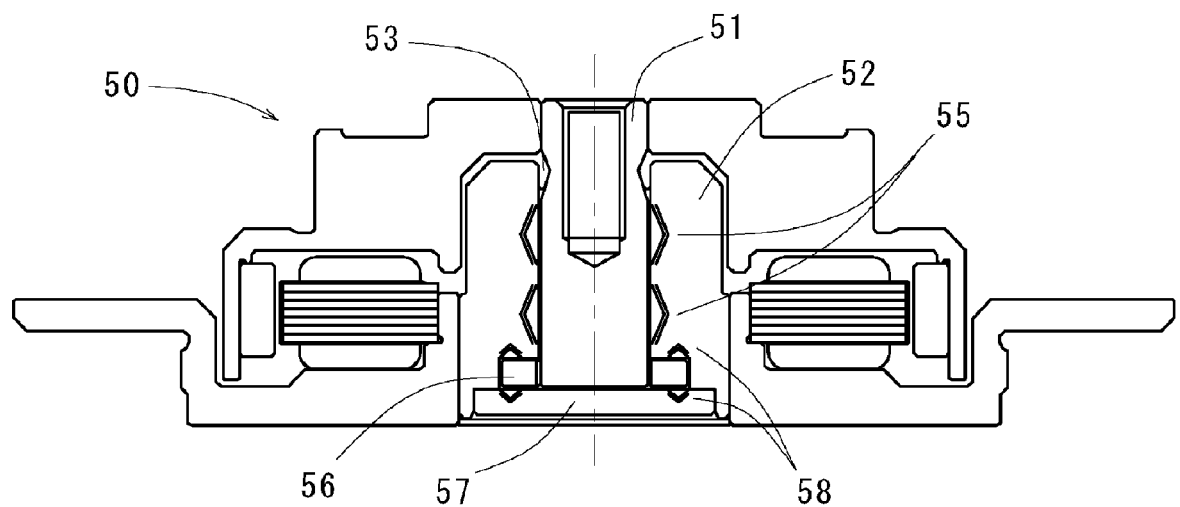
FIG. 10 is views of spindle motors fit out with fluid dynamic-pressure bearings.
Figure 10B:
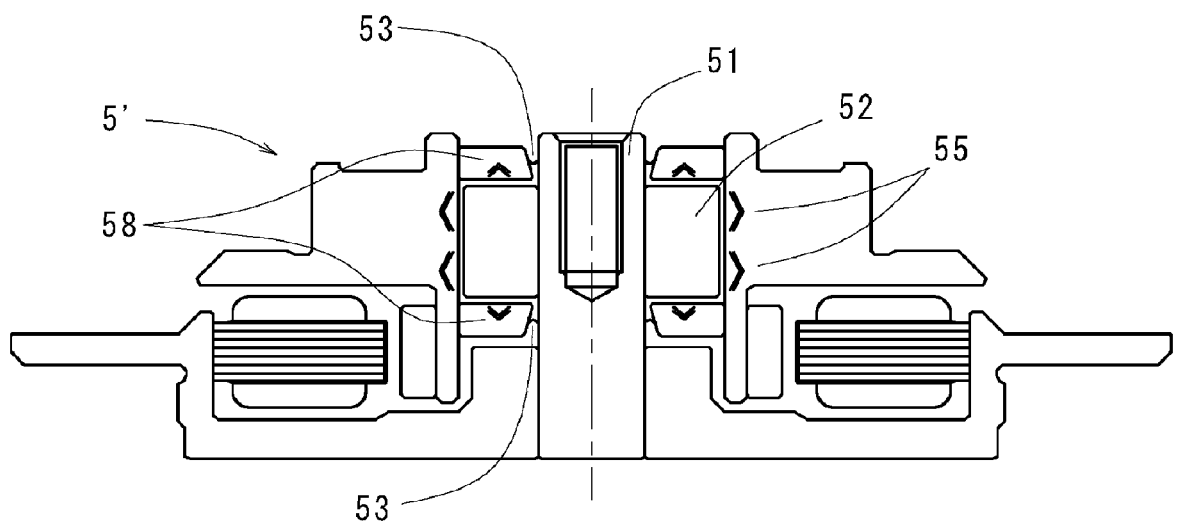

In addition to the advance degassing process, means may be devised so as to produce a deaerating effect when the lubricating fluid is fed into the fluid tank 4. FIG. 9 represents a method of trickle-feeding lubricating fluid into the fluid tank 4.

Specifically, the lubricating fluid is fed into a funnel 100, and via a microflow valve 101 is trickled in drops into the fluid tank 4. The fluid tank 4 interior is pumped down to 10 Pa or so. With the surface area per unit volume of the drops being large, degassing proceeds rapidly. And degassing is promoted further by the drops undergoing shock when they strike the inner surface of the fluid tank and the liquid surface.

Not-illustrated heaters are attached to the vacuum case 9 and the fluid tank 4 utilized for the preprocess degassing. The lubricating fluid is deaerated having been heated up by the heaters to 60 degrees. Degassing proceeds swiftly because in general the solubility of gasses in a liquid drops as the temperature of the liquid rises.

(3) Selection of Optimal Infusion Parameters (3-1) Deriving Formulae 1 & 2

Formula 1 is derived as the conditions under which, in the tip portion of the cylindrical capillary tube, the surface tension of the lubricating fluid and ambient pressure at the tip of the tube surpass the momentum of the fluid. The steps in that derivation will be detailed below.

The radius of the capillary-tube bore is given as a in meters (m), the length of the capillary tube as L in meters (m), the pressure between the ends of the capillary tube as P in Pascals (Pa), the lubricating-fluid viscosity coefficient as η in Pascal-seconds (Pa·s), the lubricating-fluid density as ρ in kilograms per cubic meter (kg/m³), the lubricating-fluid surface tension as σ in Newtons per meter (N/m), and the ambient pressure at the tip portion of the capillary tube as $P_m$ in Pascals (Pa). Then, as depicted in FIG. 11, the instant in which the lubricating fluid is about to outflow from the open end of the capillary tube is conceptualized.

In that state, surface tension acts, as illustrated in the figure, in between the mouth of the capillary tube and the lubricating fluid that has protruded out of the mouth. Under the conditions in which the momentum that the lubricating fluid had is completely taken up by this surface tension and ambient pressure, the lubricating fluid does not fly off from the open end, but is captured in the mouth of the capillary tube. In order to realize a precision fluid-dispensing operation, the lubricating fluid must be supplied to the bearing-gap open portion with the fluid bereft of its impetus. Such conditions can be obtained by calculating the impulse due to surface tension and ambient pressure acting per unit volume of the outflowing lubricating fluid, and finding the conditions under which the momentum does not surpass this impulse.

Figure 11:
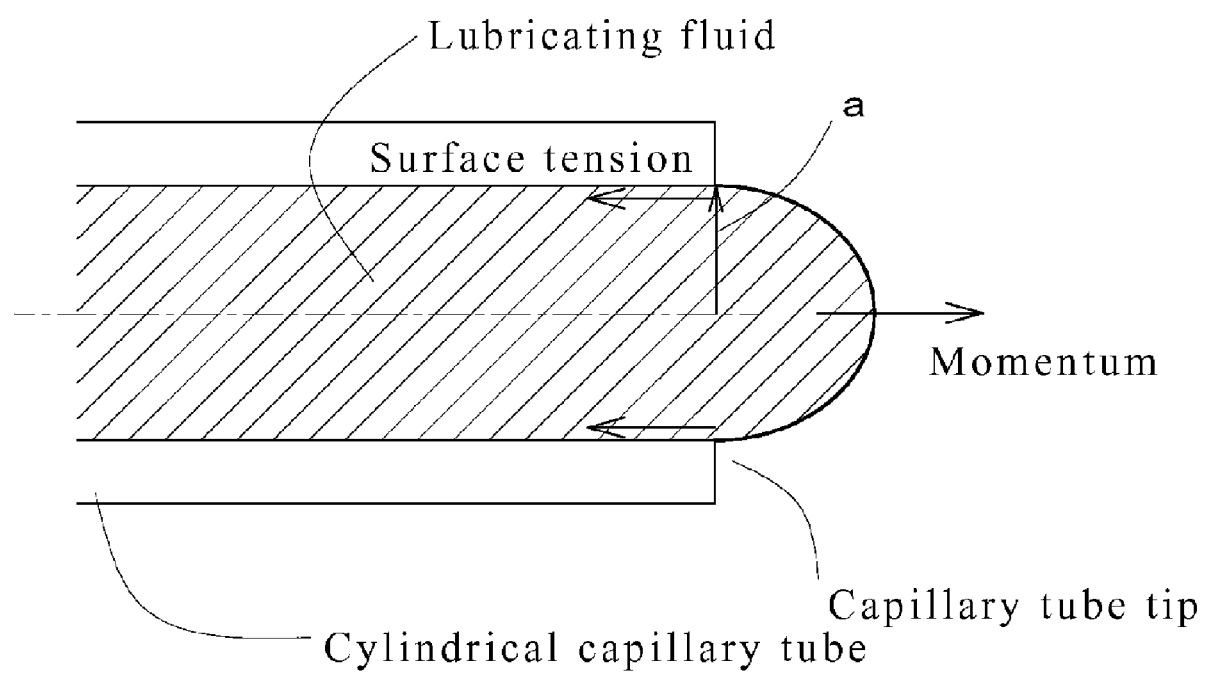
FIG. 11 is an enlarged view of the tip of a cylindrical capillary tube.

As is clear from FIG. 11, at the instant in which the lubricating fluid starts to outflow from the open end of the capillary tube, the surface of the lubricating fluid extends roughly parallel to the longitudinal axis of the tube, and adjoins the rim of the open end. This means that the force necessary to brake the outflowing lubricating fluid will be the value of the surface tension in the fluid multiplied by the circumferential length of the open end of the capillary tube. Hence, the conditions sought are calculated as follows.

Surface tension acting along the mouth of the capillary tube tip:

$$2\pi a \sigma \qquad \text{Exp. 3}$$

impulse acting on the lubricating fluid during incremental time Δt $$2\pi a \sigma \Delta t \qquad \text{Exp. 4;}$$

momentum of outflowing lubricating fluid during incremental time Δt $$mu = \pi a^2 u \Delta t \rho u = \pi a^2 \rho \left(\frac{P a^2}{L\, 8\eta}\right)^2 \Delta t \qquad \text{Exp. 5}$$

(wherein u is the speed of the lubricating fluid flowing within the capillary tube); and impulse due to fluid surface tension and ambient pressure having to exceed fluid momentum:

$$(2\pi a \sigma + \pi a^2 P_m)\Delta t > \pi a^2 \rho \left(\frac{P a^2}{L\, 8\eta}\right)^2 \Delta t. \qquad \text{Exp. 6}$$

Simplifying the above relation yields Expression 1. It will be understood that Expression 2, as the conditions under which Expression 1 is satisfied with the surface tension σ being zero, is obtained directly from Expression 1.

Solving Expression 6 for L yields $$L > \sqrt{\frac{a^5 P^2 \rho}{64\eta^2 (2\sigma + P_m a)}}\,. \qquad \text{Exp. 7}$$

Utilizing Expression 7 is convenient in defining the lower limit of a suitable length for the cylindrical capillary tube, as set forth in Table 1 hereinafter. Likewise, the upper limit is $$\sqrt{\frac{a^4 P^2 \rho}{64\eta^2 P_m}} > L. \qquad \text{Exp. 8}$$

It should be noted that Expression 1 can be written utilizing the Weber number, which is the ratio of the inertia acting on the fluid boundary surface, to the boundary surface tension:

$$2 > We - P_m \frac{a}{\sigma}, \qquad \text{Exp. 9}$$

wherein $$We = \frac{\rho a u^2}{\sigma}. \qquad \text{Exp. 10}$$

(3-2) Results of Infusion Job

Varying the surface tension and the viscosity coefficient, fluid dispensing jobs were carried out to evaluate cylindrical capillary tubes of various sizes. The job parameters are set forth in Table 1. The capillary tubes employed are products manufactured by EFD Inc. in the United States, and are made of stainless steel. The "27G," "30G," and "32G" in the "gauge" column in the table are specifications, used by the manufacturer on its products, as to the needle bore. Because dimensional tolerances attend each respective bore and thus the inner radius varies by product, for the inner-radius values in the table, the upper and lower limits given by the manufacturer are displayed.

The lubricating fluid employed was a polyol ester type, and in Conditions A through G was tested at 20° C., and in H through J, at 40° C. Conditions H through J also differed in that the viscosity and surface tension were altered in order that the fluid strongly undergo the influence of temperature, and in that the vacuum chamber internal pressure during the fluid dispensing job was set to 30 Pa. In all Conditions A through J, the experiment was conducted on cylindrical capillary tubes from five manufacturing lots each differing from the others.

TABLE I

| Cond. | Gauge | Inner Radius (mm) | Dspns. press. (hPa) | Viscosity coeff. ($10^{-2}$ m²/s) | Dens. | Surface tension ($10^{-2}$ N/m) | Chamb. press. | Cap. tube length |
|---|---|---|---|---|---|---|---|---|
| A | 27 G | 0.114~0.095 | 1013 | 1.9 | 9.1 | 3.1 | 10 | 12.7 |
| B | 27 G | 0.114~0.095 | 1013 | 1.9 | 9.1 | 3.1 | 10 | 8.0 |
| C | 30 G | 0.089~0.070 | 1013 | 1.9 | 9.1 | 3.1 | 10 | 12.7 |
| D | 30 G | 0.089~0.070 | 1013 | 1.9 | 9.1 | 3.1 | 10 | 8.0 |
| E | 30 G | 0.089~0.070 | 1013 | 1.9 | 9.1 | 3.1 | 10 | 6.4 |
| F | 32 G | 0.060~0.040 | 1013 | 1.9 | 9.1 | 3.1 | 10 | 6.4 |
| G | 32 G | 0.060~0.040 | 1013 | 1.9 | 9.1 | 3.1 | 10 | 5.0 |
| H | 30 G | 0.060~0.040 | 1013 | 0.97 | 9.0 | 2.4 | 30 | 12.7 |
| I | 30 G | 0.060~0.040 | 1013 | 0.97 | 9.0 | 2.4 | 30 | 6.4 |
| J | 30 G | 0.060~0.040 | 1013 | 0.97 | 9.0 | 2.4 | 30 | 4.2 |

TABLE II

| Cond. | Expression 1 left side | Expression 2 left side | Length low. lmt. (mm) | Length up. lmt. (mm) | Cap. tube length (mm) | Dspns. job rating |
|---|---|---|---|---|---|---|
| A | 544~653 | 413~194 | 11.1 | 57.4 | 12.7 | Good |
| B | 544~653 | 1057~504 | 11.1 | 57.4 | 8.0 | Poor |
| C | 697~886 | 147~50 | 6.0 | 31.2 | 12.7 | Good |
| D | 697~886 | 386~142 | 6.0 | 31.2 | 8.0 | Good |
| E | 697~886 | 609~227 | 6.0 | 31.2 | 6.4 | Good |
| F | 1033~1550 | 118~15 | 2.2 | 10.2 | 6.4 | Good |
| G | 1033~1550 | 200~31 | 2.2 | 10.2 | 5.0 | Good |
| H | 800~1200 | 93~−6 | 4.9 | 11.4 | 12.7 | Good |
| I | 800~1200 | 455~66 | 4.9 | 11.4 | 6.4 | Good |
| J | 800~1200 | 1097~193 | 4.9 | 11.4 | 4.2 | Poor in part |

Table 2 sets forth the capillary-tube length upper and lower limits, found from the left side of Expression 1, the left side of Expression 2 (which equals the right side of Expression 1), and Expressions 7 and 8, and also sets forth how the actual dispensing job rated. In the "Dispensing job rating" column, "Poor" means that the lubricating fluid could not be stably dispensed. With regard to Condition J, "Poor in part" means that with fluctuations in the dispensation volume arising in some of capillary tubes of the manufacturing lot, fluid could not be dispensed stably.

Corresponding to the fact that there was a spread to the inner radii of the capillary tubes, the spread is given in indicating the values for the left side of Expression 1 and the left side of Expression 2. In the instances in which the range of values for the left side of Expression 2 fell entirely below the range of values for the left side of Expression 1, the dispensing job results were favorable. On the other hand, in the cases in which the values partially overlapped, the results were either poor in part, or poor.

In the "Length upper limit" column, minimum values when allowance is made for variations are entered; similarly, in the "Length lower limit" column, maximum values when allowance is made for variations are entered. When the actual length of the cylindrical capillary tubes exceeded the lower-limit values, the dispensation-job results were favorable. With regard to Condition H, however, the length of the capillary tubes was greater than the upper limit. This signifies the selecting of excessively long capillary tubes. Although the fluid dispensing job was possible under such conditions, in order to enhance productivity a shorter tube length should be adopted.

It should be understood that, with regard to the A, C, D, E, F, G and/conditions in which favorable results appeared, the outflow of lubricating fluid stopped with the blocking off of the valve. Regarding the conditions that proved to be poor, there were inconsistencies in timing as to when the outflow ceased.

Furthermore, the foregoing discussion has assumed that the tip of the cylindrical capillary tube is circular in cross-section (perpendicular to the capillary tube lengthwise), but even if it is elliptical in cross-section, the same parameters—the radius a of the capillary-tube bore, the capillary-tube length L, the pressure P between the capillary tube ends, the lubricating-fluid viscosity coefficient $\eta$, the lubricating-fluid density $\rho$, the lubricating-fluid surface tension $\sigma$, and the ambient pressure $P_m$ at the tip portion of the capillary tube—will be controlling. In addition to these parameters, however, the major axis of the ellipse, or else the angle $\theta$ at which the tip of the capillary tube is cut with respect to the lengthwise extent will have an effect.

If $\theta$ is small, then roughly the same relations as in Expression 1 can be deemed to hold true. Large values of $\theta$ are prohibitive of using elementary calculations to find a relational formula similar to Expression 1. And the considerable angle at which the orientation of the surface tension is inclined with respect to the direction in which the lubricating fluid moves adds complexity to the movement of the lubricating fluid in the capillary-tube tip. Nevertheless, even in such instances, the relationship between the momentum of the lubricating fluid and the impulse due to the fluid's surface tension dictate the phenomena that occur in the lubricating fluid, and thus Expression 1 proves to be an effective criterion for judgment.

The best mode, explained in the foregoing, for embodying the present invention is not limited by the content set forth herein. For example, as the dynamic-pressure bearing device into which lubricating fluid is dispensed, a shaft-rotating type has been depicted, but the effects of the present invention when applied to a shaft-stationary type of dynamic-pressure bearing device do not alter. The present invention is equally well implemented in applications in which lubricating fluids having a higher coefficient of viscosity, as well as fluids having greater or lesser surface tension, are employed. By the same token, the fluids are not limited to lubricants; the effects of the present invention will be available with any fluid put to use in infusion jobs under a reduced-pressure environment.

What is claimed is:

1. An infusion method for streaming under a reduced-pressure environment a predetermined quantity of a liquid into a component being a target, utilizing a nozzle in the form of a cylindrical capillary tube, the infusion method comprising:
a pressure-adjusting step of placing the target component and the capillary-tube tip portion under a reduced-pressure environment; and
an infusion step of supplying to the cylindrical capillary tube liquid to which has been applied pressure higher, by a pressure for delivering the liquid, than the pressure under the reduced-pressure environment, and for causing, for a predetermined duration only, the liquid to flow out from the capillary-tube tip directed at the target component; wherein in SI system units, the following formula is satisfied $$\frac{2\sigma}{a} > \rho\left(\frac{P}{L}\frac{a^2}{8\eta}\right)^2 - P_a,$$

letting a be the radius of the capillary-tube bore, L be the capillary-tube length, η be the liquid's viscosity coefficient, σ be the liquid's surface tension, ρ be the liquid's density, P be the liquid delivery pressure, and $P_a$ be the pressure of the reduced-pressure environment.

2. An infusion method as set forth in claim 1, wherein the formula $$\rho\left(\frac{P}{L}\frac{a^2}{8\eta}\right)^2 - P_a > 0$$

is also satisfied.

3. An infusion method as set forth in claim 1, wherein:
in said infusion step, the liquid is supplied from a liquid-supplying mechanism to the cylindrical capillary tube;
a valve mechanism is interposed between the liquid-supplying mechanism and the cylindrical capillary tube;
the valve mechanism has a shutoff adjacent to the basal portion of the cylindrical capillary tube; and
the shutoff is for blocking off and subsequently opening a fluid flowpath through the valve mechanism and the cylindrical capillary tube.

4. An infusion method as set forth in claim 2, wherein:
in said infusion step, the liquid is supplied from a liquid-supplying mechanism to the cylindrical capillary tube;
a valve mechanism is interposed between the liquid-supplying mechanism and the cylindrical capillary tube;
the valve mechanism has a shutoff adjacent to the basal portion of the cylindrical capillary tube; and
the shutoff is for blocking off and subsequently opening a fluid flowpath through the valve mechanism and the cylindrical capillary tube.

5. An infusion method as set forth in claim 3, wherein atmospheric pressure is utilized as the pressure source for imparting the delivery pressure to the liquid.

6. An infusion method as set forth in claim 4, wherein atmospheric pressure is utilized as the pressure source for imparting the delivery pressure to the liquid.

7. An infusion method as set forth in claim 3, wherein:
the quantity of liquid outflowing from the cylindrical capillary tube within the time required for the valve mechanism to switch from shutting off to opening the flowpath, or within the time required for the valve mechanism to switch from opening to shutting off the flowpath, is negligibly small compared with an infusion quantity of liquid targeted for infusion into the target component; and
in said infusion step, the infusion quantity is controlled by adjusting the length of time the valve mechanism is open.

8. An infusion method as set forth in claim 4, wherein:
the quantity of liquid outflowing from the cylindrical capillary tube within the time required for the valve mechanism to switch from shutting off to opening the flowpath, or within the time required for the valve mechanism to switch from opening to shutting off the flowpath, is negligibly small compared with an infusion quantity of liquid targeted for infusion into the target component; and
in said infusion step, the infusion quantity is controlled by adjusting the length of time the valve mechanism is open.

9. An infusion method as set forth in claim 5, wherein:
the quantity of liquid outflowing from the cylindrical capillary tube within the time required for the valve mechanism to switch from shutting off to opening the flowpath, or within the time required for the valve mechanism to switch from opening to shutting off the flowpath, is negligibly small compared with an infusion quantity of liquid targeted for infusion into the target component; and
in said infusion step, the infusion quantity is controlled by adjusting the length of time the valve mechanism is open.

10. An infusion method as set forth in claim 6, wherein:
the quantity of liquid outflowing from the cylindrical capillary tube within the time required for the valve mechanism to switch from shutting off to opening the flowpath, or within the time required for the valve mechanism to switch from opening to shutting off the flowpath, is negligibly small compared with an infusion quantity of liquid targeted for infusion into the target component; and
in said infusion step, the infusion quantity is controlled by adjusting the length of time the valve mechanism is open.

11. An infusion method as set forth in claim 1, wherein:
the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

12. An infusion method as set forth in claim 2, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

13. An infusion method as set forth in claim 3, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

14. An infusion method as set forth in claim 4, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

15. An infusion method as set forth in claim 5, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

16. An infusion method as set forth in claim 6, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

17. An infusion method as set forth in claim 7, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

18. An infusion method as set forth in claim 8, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

19. An infusion method as set forth in claim 9, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

20. An infusion method as set forth in claim 10, wherein:

the target component is, in a dynamic-pressure bearing device having a rotary component and a stationary component supporting the rotary component, letting the rotary component rotate relative to the stationary component, a bearing gap maintained in between the rotary component and the stationary component, and at least one open portion formed in one end of the bearing gap, the open portion surrounding the rotary component and fronting on the surrounding external air, the bearing-device open portion; and the liquid is a lubricating fluid that the dynamic-pressure bearing device retains.

* * * * *